United States Patent
Lee et al.

(10) Patent No.: US 6,240,546 B1
(45) Date of Patent: May 29, 2001

(54) IDENTIFYING DATE FIELDS FOR RUNTIME YEAR 2000 SYSTEM SOLUTION PROCESS, METHOD AND ARTICLE OF MANUFACTURE

(75) Inventors: David Eugene Lee, Livermore, CA (US); Greg Alan Dyck, Poughkeepsie, NY (US); William Augustus Carter, Georgetown, KY (US); Brian Barry Moore; Leslie Charles Balfour, both of Poughkeepsie, NY (US); John David Rotramel; Gary V. Railsback, both of Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/122,560

(22) Filed: Jul. 24, 1998

(51) Int. Cl.[7] ....................................... G06F 9/45
(52) U.S. Cl. ...................... 717/4; 717/1; 707/6; 707/101
(58) Field of Search ................... 395/704, 705; 707/100, 101; 717/1, 4, 5, 11

(56) References Cited

U.S. PATENT DOCUMENTS

| | | | |
|---|---|---|---|
| 5,630,118 | * | 5/1997 | Shaughnessy ............................. 707/1 |
| 5,668,989 | * | 9/1997 | Mao ....................................... 707/101 |
| 5,740,442 | * | 4/1998 | Cox et al. ............................... 395/704 |
| 5,765,145 | * | 6/1998 | Masiello .................................. 707/1 |
| 5,794,048 | * | 8/1998 | Brady .................................... 395/705 |
| 5,806,067 | * | 9/1998 | Connor .................................. 707/100 |
| 5,808,889 | * | 9/1998 | Burgess ................................. 708/530 |
| 5,838,979 | * | 9/1997 | Hart et al. .............................. 395/707 |
| 5,878,422 | * | 3/1999 | Roth et al. .............................. 707/100 |
| 5,915,116 | * | 6/1999 | Hochman et al. ...................... 395/705 |
| 5,926,814 | * | 7/1999 | Fridman ................................. 707/6 |
| 5,956,510 | * | 9/1999 | Nicholas ................................. 717/1 |
| 5,987,253 | * | 11/1999 | Brady et al. ............................. 717/4 |
| 6,003,028 | * | 12/1999 | Koeing ................................... 707/6 |
| 6,041,330 | * | 3/2000 | Carman et al. ........................ 707/101 |
| 6,067,544 | * | 5/2000 | Moore .................................... 707/6 |
| 6,071,317 | * | 9/1999 | Nagel .................................... 717/4 |
| 6,078,734 | * | 6/2000 | Carter et al. ............................ 716/1 |
| 6,092,073 | * | 7/2000 | Coletti .................................. 707/101 |

OTHER PUBLICATIONS

Hart et al, "A scaleable automated process for year 2000 system correction", Proc. of ICSE, pp. 475–484, 1996.*

Gowan et al., "Y2K compliance and the distributed enterprise", Comm. of the ACM vol. 42, No. 2, pp. 68–73, Feb. 1999.*

Deursen, "The Date Crisis" Comm. of the ACM, vo. 5, pp. 26–30, May. 1997.*

Szczepanik, Documenting a year 2000 testing project, ACM pp. 143–152, 1998.*

Stonebraker et al., "The aequola 2000 storage benchmark", SIGMOD ACM, pp. 2–11, Feb. 1999.*

* cited by examiner

*Primary Examiner*—Mark R. Powell
*Assistant Examiner*—Anil Khatri
(74) *Attorney, Agent, or Firm*—Prentiss W. Johnson

(57) ABSTRACT

A method, apparatus, and article for solving the year 2000 problem involve processing a computer object program to identify object code instructions referencing date information for an operation which involves more than one century. The object code is altered by altering each identified instruction with an instruction to effect a transfer of control to a Year 2000 routine. The Year 2000 routine is a routine for altering the execution of an identified instruction in accordance with the Year 2000 routine and thereafter returning control to the object code.

22 Claims, 3 Drawing Sheets

IDENTIFYING DATE FIELDS FOR RUNTIME YEAR 2000 SYSTEM SOLUTION PROCESS, METHOD AND ARTICLE OF MANUFACTURE

RELATED APPLICATION

This invention relates to a patent application being filed simultaneously via U.S. Express Mail Label No. EM297284745US on Jul. 24, 1998 and entitled "Runtime Year 2000 System Solution Process, Method and Article of Manufacture," the contents of which are incorporated by reference herein.

BACKGROUND OF THE INVENTION

1. Field of the Invention

The present invention relates generally to computer programs and their associated run-time environments, and in preferred embodiments, to a computer-implemented method, apparatus, and article of manufacture for a runtime solution to the Year 2000 problem.

2. Description of the Related Art

Computer systems used in various processing applications, such as, for example, processing insurance information, account information, inventory information, investment information, retirement information, as well as many other applications, often operate with records and data containing date-dependent information. In many computing systems, date information relating to years has typically been represented in two-digit year formats, where two digits represent a year between 1900 and 1999. Thus, for example, the two digits "97" would represent the year 1997. Popular usage of this simplified date information format throughout the computer industry has resulted in an industry-recognized problem, often referred to as "the Year 2000 problem," (or the "Y2K Problems).

More specifically, as a result of this simplification of date information, upon the turn of the century (i.e., upon the year 2000), two-digit year information intended to represent a year within the 21st century will, instead, be indistinguishable by computer systems from a year within the 20th century (i.e., between 1900 and 1999). Thus, for example, a two-digit year value of "08" which is intended to represent the year 2008 will be indistinguishable from the year 1908 by such computer systems.

More specifically, Year 2000 problems occur when calculations and comparisons cross the year 2000 boundary. For example, calculating two years beyond the year 1999 (represented as "99") yields an arithmetically correct result of 101, but the computer system may truncate this to 01, since only two digits are allowed. As a further example, the comparison of the year 1999 (represented as "99") against 2000 (represented as "00") may yield the result that a date in the year 1999 is "after" (arithmetically greater) than the year 2000.

Various solutions to the "Year 2000 problem" have been suggested. However, previously proposed manners of implementing such solutions have generally required source code changes. The solutions not requiring source code changes were generally incompatible with source code remediated applications.

For example, three widely recognized techniques to address the year 2000 problem are: expansion, windowing, and compression. The expansion technique, in general, involves a conversion of 2-digit years to 4-digit years. This solves the problem of ambiguity. However, because the size of the field is larger after expansion, prior proposals to implement this technique have required modifications to application logic, data files, and databases, etc. (including backup copies). In addition, processing routines involving date information would have to be rewritten to accommodate four-digit year data. The costs and conversion time associated with such modifications can eliminate this as a practical option.

According to the windowing technique, a 2-digit year field is interpreted as a year within a 100 year window of time. In the past, the year values, ranging from 0 to 99, were interpreted within the 100 year window of 1900 to 1999. The windowing technique simply allows the programmer to specify a window with a set of values different than from 1900 to 1999, for example, from 1960 to 2059. In the simple form of this technique, a single window is used for all windowed items in the executable module. For example, a "pivot point" is defined and all two digit year dates at or below this pivot point are assumed to be in the twenty-first century, while all other dates are assumed to be in the twentieth century.

In addition to this "single" window technique, multiple windows may be supported by allowing different window values to be defined for each program variable in the source module. For example, values representing birth dates ranging from 1920 to the present may coexist in a module with values representing retirement dates ranging from 1960 to 2059. Multiple windows provide a significant additional capability in terms of flexibility and power.

However, prior windowing proposals required changes to program logic (typically in source programs) which, in the past, was accomplished by modifying each instance in a source code in which date information is used. Tools, such as Vantage YR2000™ from Millennium Dynamics, FIELDEX™ from STA America and 2000-Resolve™ from Micro Focus, have been developed to help analyze and modify source code statements. However, such source code modifications tend to increase the complexity of the source code, make debugging operations more difficult and, in some cases, increase the propensity for errors. The Millennium Language Extensions ("MLE") technology (as described in co-pending application Ser. No. 08/899,444, which is incorporated herein by reference) generally avoids logic changes, but still requires data division changes.

According to compression techniques, values greater than 99 are stored in the same space previously used to store two-digit year values. One previous manner proposed for implementing this function involved changing the datatype, for example, from character to binary, thus allowing values as large as 32,767 in the same two-byte field. However, such prior proposals require changing all recorded data to the new datatype, as well as changing program data declarations and, in some cases, program logic. Procedures for effecting such changes can be relatively complex, time consuming and error prone.

Therefore, although techniques have been developed for addressing the Year 2000 problem, there is still a need in the art for a method which allows the problem to be addressed in an economical and practical manner without requiring source code changes or requiring the availability of source and/or compilation/assembly listings.

SUMMARY OF THE DISCLOSURE

Therefore, embodiments of the present invention relate generally to methods, apparatuses, and articles of manufacture for solving the Year 2000 problem, and avoiding problems associated with prior techniques requiring source code modifications. Preferred embodiments involve a runtime procedure and system which operate with the object code and, thus, are capable of mitigating Year 2000 application errors without the need to make changes to application source code. A process and system according to embodiments of the invention, is "complete" insofar as providing a methodology that, when executed accurately will provide correct and definable remediation for an object code. In addition, it also provides for an implementation which will provide the user with a workable migration path to source code remediation. This migration will allow complete interoperability between runtime remediated code and source code remediated code. One aspect of such embodiments involves the definition of two new hardware instructions (along with operating system simulation in the case where the new instructions are not available) which will improve the efficiency of the solution.

A process, according to one exemplary embodiment, involves modifying or replacing object code instructions that require an operation on year 2000 date-dependent information (such as an add operation, compare operation, subtract operation) with further object code instructions that temporarily transfer control to a program, or fix routine. The fix routine performs a Year 2000 solution algorithm or technique on date-dependent information, such as, but not limited to, windowing, expansion or compression, before performing the operation required by the initial object code instruction.

For example, a user desiring to resolve a Year 2000 problem may perform a process according to embodiments of the present invention, as follows:

First, a user may identify starting seeds; that is, source code variables or fields in input records which contain Yr2KDate components or the application may be run without starting seed input and rely on its internal date recognition algorithms to identify seeds.

Alternatively or thereafter, the program is executed against sample and/or production data (files or screen I/O), and the results are analyzed by the user, for example with an automated analysis tool, to identify additional Yr2KDates. The additional Yr2KDates become additional seeds. The program identifies additional dates as they are "propagated" by the program logic and may be re-executed one or more additional times, until the program identifies no additional dates and the user agrees that no more unidentified Yr2KDates remain.

Each instruction that operates on a Yr2KDate is altered (or replaced with a further instruction) to effect a transfer of control to a Year 2000 solution program (a runtime fix code) upon attempt to execute the instruction. The runtime fix code, then alters the execution of the instruction in a manner which provides a Year 2000 correct result.

Therefore, one advantage of preferred embodiments of the present invention, is that modifications to the source code and data or input files may be avoided. Accordingly, a user with access to the object code may perform Year 2000 procedures in accordance with embodiments of the present invention, without the need to have access to the source code and without the need to recompile the source code.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which are shown, by way of illustration, several embodiments of the present invention. It is understood that other embodiments may be utilized and structural changes may be made without departing from the scope of the present invention.

Overview

The present invention relates to a method, apparatus, and article of manufacture for resolving what has become known as "the Year 2000 problem" in computer programs using, in preferred embodiments, a runtime technique on object code or object code portions that are associated with calculations (or other operations) on two-digit year date information in two different centuries.

In the context of embodiments described herein, a two-digit year date is a portion of a specific operand of an instruction in a CSECT of a load module (using common IBM S/390 nomenclature). For example, consider the following COMPARE DECIMAL instruction located at a specific offset in a specific CSECT in a specific application:

CP 12(2,3), 124(2,4)

(While the example is applicable to other conventional computer architectures, for purposes of consistency and simplification of the present disclosure, IBM S/390 architecture is assumed herein.)

The above instruction has two operands. The first operand is 3 bytes long and the first byte of the first operand is 12 bytes past the address specified in register 3. The second operand is also 3 bytes long and the first byte of this operand is 124 bytes past the address specified in register 4. Assuming that the application uses Julian Dates (form of 'yyddd') and that both operands require Year 2000 date remediation, the first two "nybbles " (first byte) of the first operand in the 'CP' instruction are a two-digit-year and the first two nybbles (first byte) of the second operand are a two-digit-year in the 'CP' instruction, and are subject to Year 2000 errors.

Dates for remediation purposes are not specific locations in memory, but are specific portions of specific operands of specific instructions. For clarity these specific dates are referred to herein as Yr2KDates, to differentiate them from the traditional definition of a date.

As described above, the nature of the Year 2000 problem creates calculations that, while being arithmetically correct, do not yield the results desired by the user in Year 2000 situations. These calculations are referred to herein as "Year 2000 incorrect" to avoid confusion between correctness from the perspective of computer architecture versus correctness from the perspective of the application programmer trying to make an application work across the year 2000 boundary.

Hardware Environment

Figure 1:
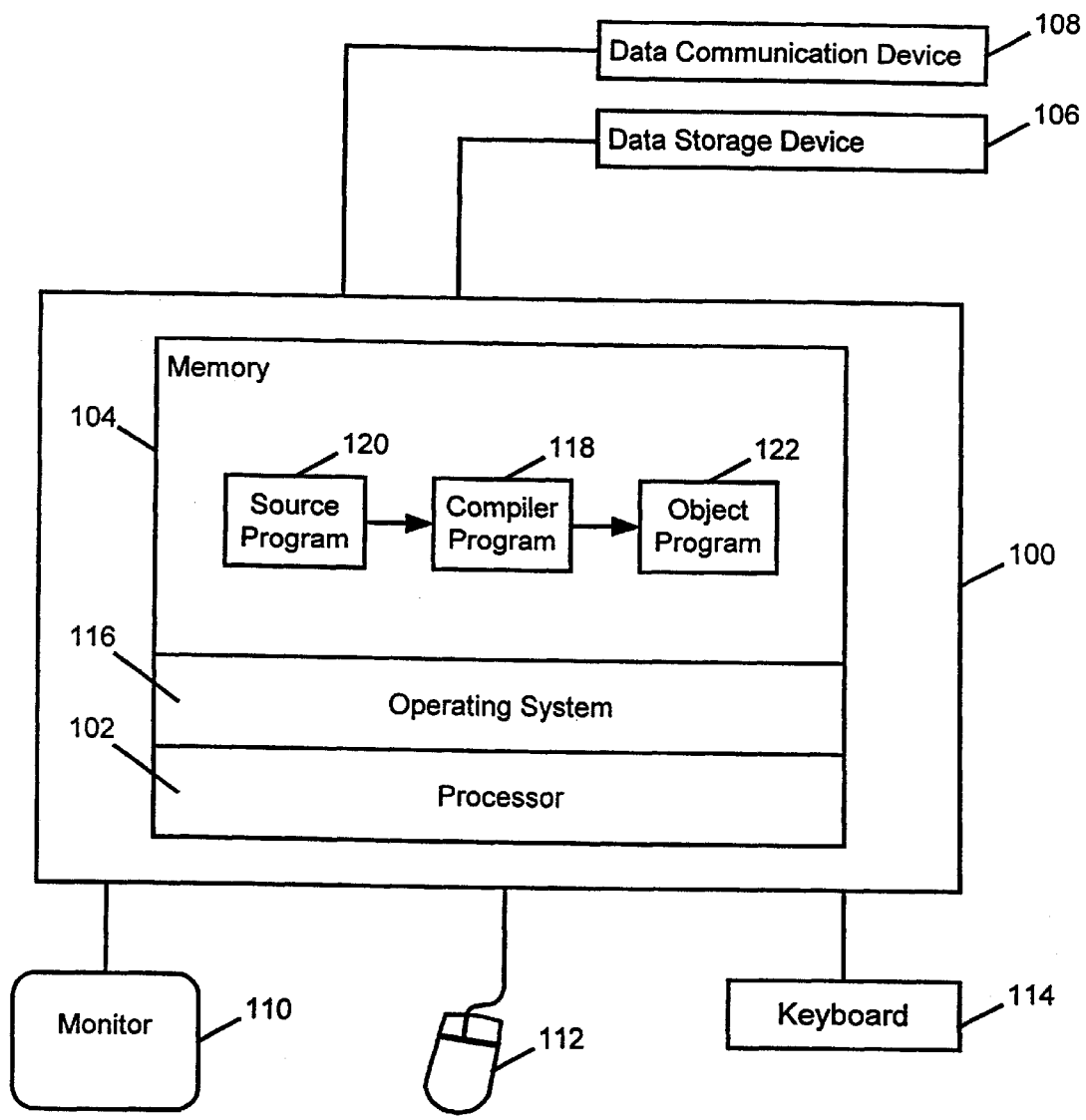
FIG. 1 is an exemplary hardware environment used to implement the preferred embodiment of the invention.

FIG. 1 is an exemplary hardware environment used to implement preferred embodiments of the invention. Embodiments of the present invention may be implemented using a computer 100, which generally includes, inter alia, a processor 102, random access memory (RAM) 104, data storage devices 106 (e.g., hard, floppy, and/or CD-ROM disk drives, etc.), data communications devices 108 (e.g., modems, network interfaces, etc.), monitor 110 (e.g., CRT, LCD display, etc.), mouse pointing device 112 and keyboard 114. It is envisioned that, attached to the computer 100 may be other devices such as read only memory (ROM), a video card, bus interface, printers, etc. Those skilled in the art will recognize that any combination of the above components, or any number of different components, peripherals, and other devices, may be used with the computer 100.

The computer 100 typically operates under the control of an operating system 116, such as OS/2™, OS/390™ (Runtime Analyzer), Windows95™, AIX™, UNIX™, DOS™, MVS™ etc. The computer 100 may further operate under the control of a program, such as source program 120, to perform various tasks which may involve date-dependent information as described above. The source program is compiled by a compiler 118, which is a computer program that translates the source program 120 into an equivalent object program 122.

The source language may be, for example, a high-level language like COBOL, PL/I, C++, a lower level language such as assembler and the object language is the machine language of the computer. The translation of the source program into the object program occurs at compile time; the actual execution of the object program occurs at run-time.

A compiler must perform an analysis of the source program and then it must perform a synthesis of the object program, wherein it first decomposes the source program into its basic parts, and then builds the equivalent object program parts from the source program parts. As a source program is analyzed, information is obtained from, for example, procedural statements, such as loops and file I/O statements.

Compilers for the COBOL, PL/I, and C++ programming languages and assemblers are well known in the art. In addition, run-time environments for COBOL, PL/I, or C++ based computer programs are also well known in the art.

The present invention relates generally to computer programs and their associated run-time environments, and in preferred embodiments, to a computer-implemented method, apparatus, and article of manufacture for solving the Year 2000 problem.

Figure 2:
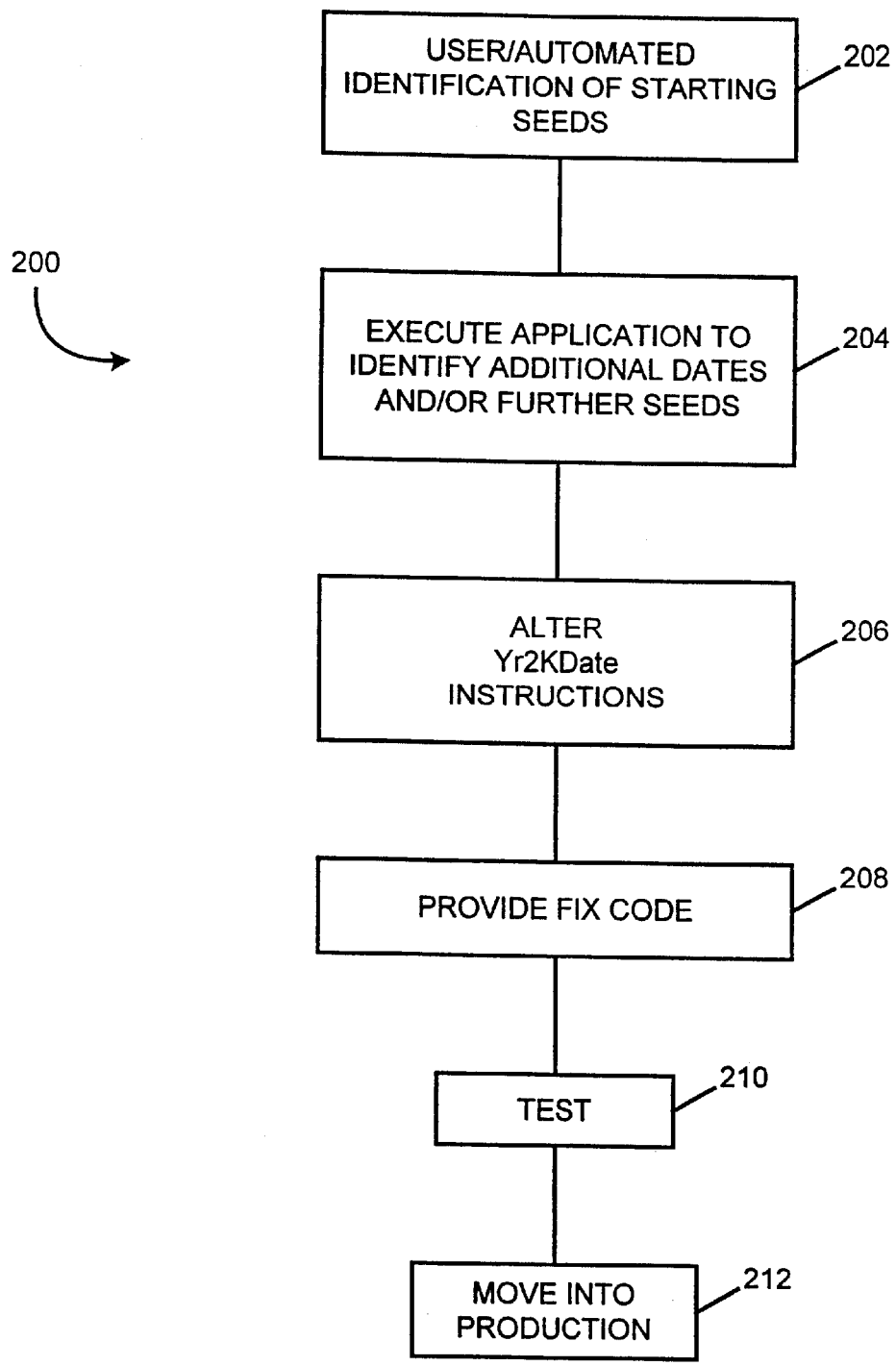
FIG. 2 is a diagram that provides a generalized illustration of a process and system for implementing a Year 2000 solution in accordance with a preferred embodiment of the present invention.

A Year 2000 remediation process and system 200, employing a computer (such as shown in FIG. 1) is generally described in connection with diagram of FIG. 2. The diagram in FIG. 2 includes an optional step 202 of identifying starting seeds, a step 204 of executing an application to identify further seeds, a step 206 of altering (or replacing) Yr2KDate instructions in the object code, a step 208 of providing a fix code, a step 210 of testing the remediated object code and a step 212 of moving the object code into production.

More specifically, as a starting point, one or more initial starting seeds are identified. These seeds are either source code variables or specific fields in input records (either files or screen I/O) which are identified, for example, as referencing date-dependent information, and are specified by the user as containing Yr2KDate components.

For example, a user having access to the object code for an application may first attempt to identify one or more known or expected starting seeds in the object code, based on the user's knowledge of the code, as represented by step 202. Alternatively, or in addition, a date identification program may be employed by the user or be implemented in software as part of the "application execution monitor" (314 in FIG. 3) to identify one or more starting seeds, for example, by identifying operand values (strings of operands) that are likely to be date items. For example, the date identification program may operate with a database (or file) storing a list of values (strings of operands) that could qualify as dates. If a set of values (string of operands) in the code matches a set of values (or string) stored in the list, then the set of values in the code is identified by the program as a potential date. Thus, based on Julian Date format (yyddd), values (or strings) that could qualify as date items and, thus, that would be in the stored list, have ddd values in the string corresponding to days between day 1 and day 365 of a year, and yy values in the string corresponding to two digit year values. A suitable list and program may be operated with further date formats, other than Julian.

Alternatively or in addition, once at least one seed is identified, further dates may be identified by a date propagation program, which identifies potential date locations propagated through the code from an initially identified seeds (or dates). For example, the date propagation program may recognize certain instructions (including, but not limited to, for example, addition, subtraction, comparison, move, block move, data transformation or the like) which operate with a known date location in the code and result in a further date location in the code.

Thus, an addition (or subtraction) instruction which adds a value to (or subtracts a value from) a value in an identified date field and saves the result in a further field will be recognized by the propagation program, and the "further field" will be identified by the program as a potential date field. Similarly, an instruction which moves (or block moves) a value in an identified date field to a further field will be recognized by the propagation program, and the "further field" will be identified by the program as a potential date field. Similarly, an instruction which compares an identified date field with a further field will be recognized by the propagation program, and the "further field" will be identified by the program as a potential date field. Preferably, each "further field" is identified to the user, for example, by a routine of the propagation program to display information associated with the identified "further field" (for example, on monitor 110, in FIG. 1), to allow the user to verify that the "further field" is, in fact, a date field. Verification by the user may be provided through a suitable user interface, such as keyboard 114, or mouse 112 in FIG. 1, or any other suitable interface. Alternatively, user verification of only the initial seed (or seeds) may be performed, while the further fields identified by the date propagation program may be assumed to be date fields with a high certainty, even without user verification. In this manner, the date propagation program, in effect, propagates the identity of one date field in the code to further date fields, and this technique can greatly improve the productivity of the iteration step between 312 and 314, which allows the user to make a single decision that covers multiple date operands.

In preferred embodiments, a combination of the above-noted date identification procedures are carried out to identify as many seeds as practical. For example, in a preferred embodiment, a user first identifies one or more known or expected starting seeds, based on the user's knowledge of the code. Next, (or alternatively) a date identification program is employed by the user to identify one or more seeds, for example, by identifying operand values (strings of operands) that are likely to be date items. Next, the seed(s) identified by the user and/or by the date identification program are used with a date propagation program, to identify further date fields. Optionally, additional seeds may be recognized by software written as part of the Application Execution Monitor (314 in FIG. 3) using the techniques described above. Information regarding at least the initially identified seed or seeds (or alternatively, more or all identified potential date fields) is displayed to the user for verification.

Alternatively or thereafter, the object program is executed against sample and/or production data (files or screen I/O), under control of the Application Execution Monitor, as represented by step 204. The additional Yr2KDates found using the techniques described above are specified as additional seeds. Other dates may be found using the date propagation program referenced above. The object program may be re-executed one or more additional times, until the program and the user determines that no more unidentified Yr2KDates remain.

Preferably, the user identifies as many seeds (dates) as possible in step 202, before running an analysis tool in step 204. In general, the more seeds that are identified in step 202, the fewer iterations will be required to identify the remaining dates in step 204. As part of either or both steps 202 and 204 (and preferably, as part of the analysis tool used in step 204), the year portion of each operand referred to by each identified Yr2KDate instruction is identified.

In step 206, each instruction that contains a Yr2KDate is altered (or replaced with a further instruction) to effect a transfer of control to a year 2000 solution program (a runtime fix code) upon attempt to execute the instruction. Step 208 involves providing a runtime fix code. The runtime fix code is stored in a suitable computer readable memory (such as, but not limited to, a hard or floppy drive) or is obtained from any suitable input source (such as an on-line source). The fix code operates during runtime to alter the execution of the object code instruction in a manner which provides a Year 2000 correct result by employing a suitable Year 2000 solution technique, for example, but not limited to, windowing, expansion or compression.

In step 210, the modified object program is tested, for example, by running the program actual or test files which contain Yr2KDates. The result of the test run may be compared, for example, against expected results. If remediation was successful, then the results should match and the modified object program may then be moved into production, step 212, for use in its intended environment.

Figure 3:
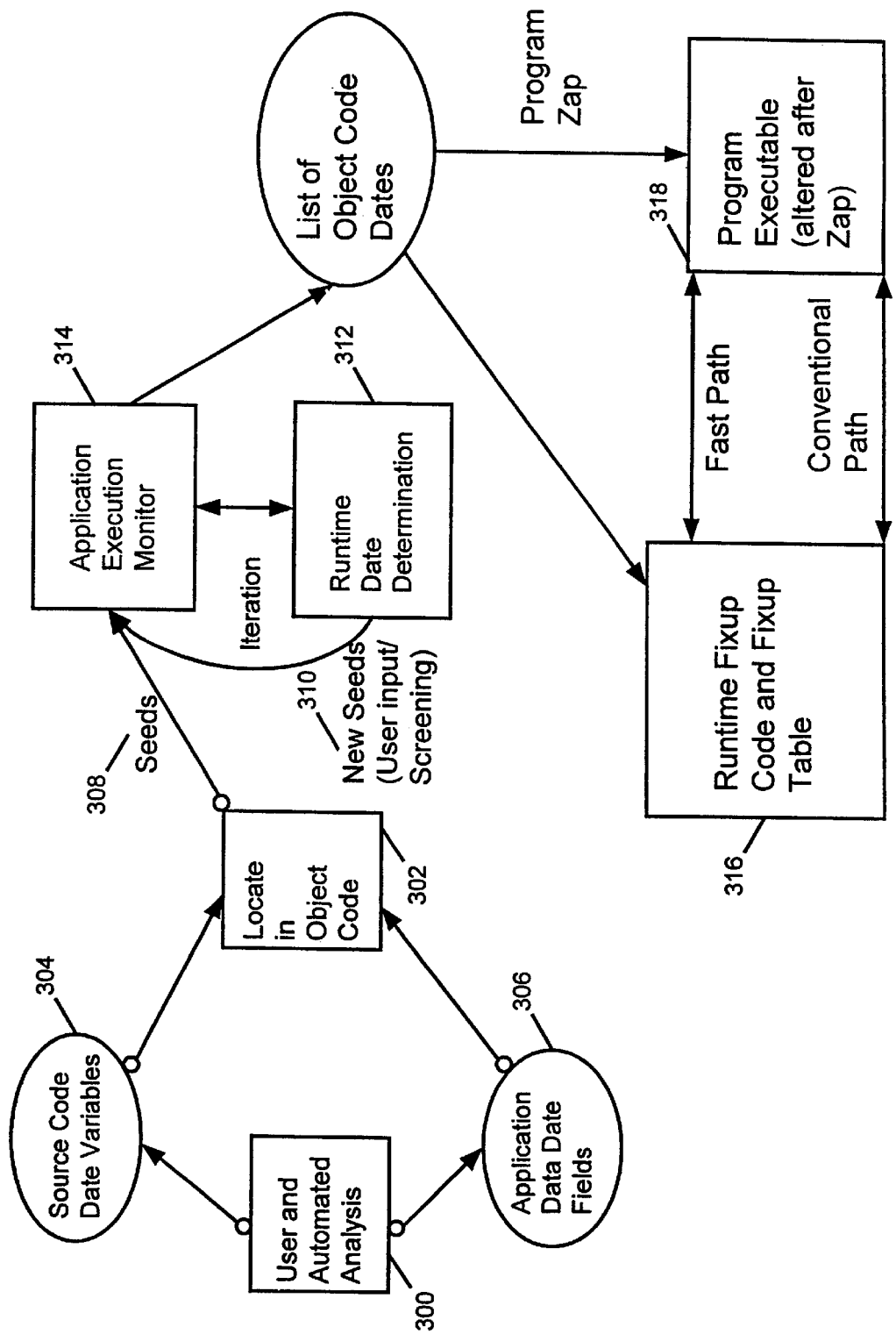
FIG. 3 is a diagram that provides a more detailed illustration of a process and system for implementing a Year 2000 solution in accordance with a preferred embodiment of the present invention.

Aspects of the above-described embodiment are described in more detail with respect to the more detailed system and process diagram of FIG. 3.

As described above with respect to step 202 in FIG. 2, an initial step of the preferred process may involve a user and automated analysis (300 in FIG. 3) of the object code to identify and locate seeds (302 in FIG. 3). The user may identify seeds, for example, in the following three forms: (1) variables (source code date variables 304) known to represent dates with two digit year components; (2) fields in input files or input screens 306 known to represent dates with two digit year components; and (3) "true dates" or specific portions of specific operands of specific instructions at specific offsets from specific CSECTS (direct user input of Yr2KDates). In each case, the user defines the Yr2KDate components of the variables or fields as seeds 308.

Where source code variables are identified as seeds, the locate procedure or means (box 302) involves a suitable program code for translating all uses of the variables identified by the user as seeds into true dates. In one embodiment, this procedure and means involves finding all source level instructions referencing the identified variables and identifying, at the operand level, the two digit date portion of the seed yielding Yr2KDates. Identification of the two digit date portion of the seed may be carried out, for example, with data typically available in cross reference information from the compiler and/or assembler. This process, however, will not typically find, for example, dates associated with compiler generated temporary variables.

Where fields are identified as seeds, the locate procedure or means (box 302) involves suitable program code for identifying (preferably with user input) all file and screen fields associated with user specified date seeds and translating these to source code variables. This will typically involve identifying the 'copybook' (or include file) containing the record mapping structures and identifying which structure components are mapped to identified date fields. Then, the procedures described above with respect to source code variables are then carried out.

In the case of object code level seeds, the input from the user is already in valid Yr2KDate form and no additional processing is required.

Also as described above with respect to FIG. 2, the preferred process further involves a step 204 for execution of the application to identify further seeds 310. A runtime date finding step and means (box 312 in FIG. 3) preferably includes a runtime execution monitor (box 314 in FIG. 3) that can examine (analyze and possibly record the operands of) any or all instructions at runtime. The runtime date finding step and means 312 also possibly includes date determination algorithms that can identify dates in program executables.

The runtime execution monitor is preferably implemented using instruction simulation and/or "remote execution" of the application. After each application instruction is executed, control is returned to the Runtime Execution Monitor for analysis.

Runtime Date Determination is run to identify all of the unidentified and executed Yr2KDates in the application being analyzed. The optional input to this process is the seeds which have been transformed into Yr2KDates by the process described above. The remaining Yr2KDates in the application may be found by running the application under control of the Runtime Execution Monitor and are determined by a determination process.

Assuming that a specific location in memory is determined to contain a Yr2KDate at a certain point of execution in the application, then, according to one suitable determination process, if this location is then used as a "source" in another instruction involving arithmetic calculation or comparison (without this location being overwritten by another instruction), then the operand (or portion thereof) referencing this location is now a potential date. In some cases this can be a simple and straightforward process. Consider, for example the following S/390™ assembler instruction:

CLC V1,V2 wherein V1 is known to have a Yr2KDate component. In this case, it can be assumed (with a high probability of being correct) that V2 also has the same Yr2KDate content as V1. A date determined in this manner has been found by "propagation" and is not a seed.

In other cases, however, the above determination procedure can be more complicated, as demonstrated by the following example, again using S/390™ architecture:

SP V1,V2 wherein V2 is subtracted from V1 and the result of which is put in V1. If V1 is known to be a date and V2 represents a 'duration' (for example 'find the date that was exactly 4 years ago'), then V1 is still a date. If V2 is a date then V1 now becomes a duration, which has date properties but is not quite the same as a date. In the case that V1 is known to have a Yr2KDate component and V2's "dateness" in unknown, V1 is left in an ambiguous state at the end of the instruction, hence the need for iteration with user feedback.

According to a further suitable determination procedure, operands of instructions potentially needing remediation can be analyzed for consistent date patterns. For example consider the instruction:

CP V1,V2

(compare V1 and V2 in Packed Decimal format). If the length of V1 and V2 is three bytes and the first two digits of both V1 and V2 are always between 80 and 99 and the last 3 digits of V1 and V2 are always 366 or less then, assuming that this instruction has been executed many times, it is reasonable to assume that V1 and V2 represent Julian formatted dates in the 1980's and 1990's. A date found in this manner becomes a seed. In some applications many cases where the first two digits have the value (for example) of 22 might indicate that this could not be a date (the application does not deal with dates as long ago as 1922), where in other applications these might be expected date values. Hence, preferred embodiments further include means for user input for verification of dates.

The above-described first determination procedure can provide an additional capability to backtrack. If, for whatever reason, a Yr2KDate (again a specific portion of a specific operand of a specific instruction at a specific offset of a specific CSECT in a specific load module) has a value determined by a previously executed MVC instruction from a different location in memory, then operands pointing to that location also have high probabilities of having Yr2KDate components (until that memory location's value is changed or becomes indeterminate). This backtracking can be achieved by either iterating (with the knowledge that a history of a specific memory location is required), by keeping a complete history of the application being run (typically not practical), or a combination of the two (limited history stored plus iteration).

For example, consider the following assembler code (note that variables in assembler code have all the characteristics required of a date except for the specific byte representing the two-digit year):

MVC V2, V1

Code not involving V2 or V1 with no branches "in or out"

CLC V2, KnownDate (where known Date has a two-digit date component). The V2 operand of the CLC instruction has a high probability of being a date since it is being compared to a known date. By backtracking, it can be determined that the V1 operand of the MVC instruction set the value of V2, so the V1 operand of the MVC instruction also has a high probability of having a two-digit date component.

As discussed above (for example, with respect to step 206 of FIG. 2), once all of the unidentified Yr2KDates in the application being analyzed have been identified, object code instructions containing a Yr2KDate reference are altered (or replaced) in a manner that causes an attempted execution of such an instruction to result in a transfer of control to a runtime fix code. According to a preferred embodiment, this may be accomplished by overlaying each instruction containing a date with an instruction (for example, a TRAP instruction) designed to transfer control to a suitable fix routine ("Runtime Fixup Code"), which preferably resides in the application's address space. The TRAP instruction includes architected support for storing program state information at the time the instruction is issued and handling program addressability issues on entry to the fixup routine.

In addition, a table is created in a suitable computer readable memory, for storing: (1) the instruction (and its offset from a specified load module/CSECT) that was overlaid plus the remediation parameters to be used on this instruction; and (2) the operand(s) containing date references including the specific byte(s) containing the two-digit year reference. A variety of techniques are available to one skilled in the art for expediting searching of such a table by the Runtime Fixup Code.

Also as described above (for example, with respect to step 208 in FIG. 2), a Runtime Fixup Code (316 in FIG. 3), for example, a Runtime Windowing Tool, is stored in a computer readable memory and operates to alter the execution of an instruction containing a Yr2KDate reference. In one preferred embodiment, the fixup code operates with the fixup table (described above), also stored in suitable computer readable memory, to identify the operands and instructions that require a Year 2000 remediation. The fixup code operates to alter the program executable with a suitable Year 2000 remediation technique (as shown at 318 in FIG. 3).

For embodiments in which alterations to the source code and data representations are to be avoided, a preferred remediation technique is windowing, using a global pivot value, as described above. However, it will be understood that other suitable remediation techniques including, but not limited to, varying pivot values, date compression, expansion, and the like may be used within the scope of further embodiments of the invention. Various remediation techniques and algorithms for implementing the same are readily available to those skilled in the art.

For each Yr2KDate, the fixup code will expand the two-digit year pursuant to the applicable fixup rules, then simulate the instruction that was instrumented using the expanded operand/operands. Thereafter, a suitable instruction (Resume Program instruction) returns control to the next instruction in the originally executing instruction stream of the application. The Resume Program instruction is used to restore state information which was saved by TRAP. (Note that this approach dictates that only arithmetic and comparison instructions need be intercepted—the vast majority of instruction types will be known in advance to not have to be handled by the fixup code).

The transfer of control processing can take, for example, two forms. According to a first preferred form of transfer, execution of an opcode (possibly an opcode architected to be invalid) creates a system interrupt that ultimately transfers control to the fixup code (and carries with it enough information to allow the fixup code to determine the proper fixup table lookup parameters). According to a second preferred form of transfer, an opcode is architected such that execution thereof directly transfers control to the Fixup Code. This will generally be much more efficient but may not be available on all hardware levels of all architectures.

According to a yet further preferred implementation, a hardware architecture enhancement, wherein the most recent versions of the hardware support option (the second preferred form of transfer described above) and versions of the hardware that do not support that form of transfer operate using the first preferred form of transfer described above, for example, via an invalid opcode interrupt. In such a case, all levels of hardware work identically with no changes other than the fact that the levels of hardware supporting the second form of transfer operate with better performance characteristics than those not supporting the second form of transfer.

Accordingly, preferred embodiments, as described above, address post-remediation/verification requirements, as well as a "find and fix" stage, in a predominantly runtime operation. Furthermore, systems according to preferred embodiments provide all of the tools required for Year 2000 remediation without the need to access source code or to recompile applications.

The foregoing description of the preferred embodiment of the invention has been presented for the purposes of illustration and description. It is not intended to be exhaustive or to limit the invention to the precise form disclosed. Many modifications and variations are possible in light of the above teaching. For example, while preferred embodiments are described above with respect to object code from a compiler, further embodiments may be similarly applicable to code from an interpreter. It is intended that the scope of the invention be limited not by this detailed description, but rather by the claims appended hereto.

What is claimed is:

1. A method of identifying date fields in a software application having instructions which operate on fields containing strings of values, comprising the steps of:
   identifying at least one string of values in storage that corresponds to potential date information having year information;
   identifying at least one object code instruction which operates with the identified at least one string of values and which results in a further date value in a further field in the application;
   identifying the further field as a potential date field;
   providing a runtime fix code, wherein the runtime fix code comprises a Year 2000 solution routine, and wherein the Year 2000 solution routine is not derived from the source code; and
   altering each identified object code instruction with an object code instruction to effect a transfer of control to the Year 2000 solution routine, without altering source code from which the object code was generated.

2. A method as recited in claim 1, wherein the step of identifying at least one string of values comprises the steps of:
   comparing strings of values in storage with a stored set of strings of values that correspond to potential date formats; and
   identifying at least one string of values in storage that matches a string of values in the stored set as a potential date field.

3. A method as recited in claim 2, wherein the step of identifying at least one string of values further comprises the steps of:
   displaying information associated with each potential date field; and
   receiving user-input verification information associated with the displayed information.

4. A method as recited in claim 1, wherein the step of identifying at least one string of values further comprises the step of:
   displaying information regarding at least one string of values to allow a single decision by the user regarding the identified string(s) of values, to apply to all of the further potential date fields.

5. A system including a computer for identifying date fields used in a software application having instructions which operate with fields for containing strings of values, comprising:
   means, performed by the computer, for identifying at least one string of values in storage that corresponds to potential date information having year information;
   means, performed by the computer, for identifying at least one object code instruction which operates with the identified at least one string of values and which results in a further date value in a further field in the application;
   means, performed by the computer, for identifying the further field as a potential date field;
   means, performed by the computer, for providing a runtime fix code, wherein the runtime fix code comprises a Year 2000 solution routine, and wherein the Year 2000 solution routine is not derived from the source code; and
   means, performed by the computer, for altering each identified object code instruction with an object code instruction to effect a transfer of control to the Year 2000 solution routine, without altering source code from which the object code was generated.

6. A system as recited in claim 5, wherein the means for identifying at least one string of values comprises:
   means, performed by the computer, for comparing strings of values in storage with a stored set of strings of values that correspond to potential date formats; and
   means, performed by the computer, for identifying at least one string of values in the code that matches a string of values in the stored set as a potential date field.

7. A system as recited in claim 6, wherein the means for identifying at least one string of values further comprises:
   a display device for displaying information associated with each potential date field; and
   an input device for receiving user-input verification information associated with the displayed information.

8. An article of manufacture comprising a computer program carrier readable by a computer and embodying one or more instructions executable by the computer to perform method steps of programming a computer to identify date fields used in a software application having instructions which operate on fields containing strings of values, the method comprising the steps of:
   identifying at least one string of values in storage that corresponds to potential date information having year information;
   identifying at least one object code instruction which operates with the identified at least one string of values and which results in a further date value in a further field in the application;
   identifying the further field as a potential date field;
   providing a runtime fix code, wherein the runtime fix code comprises a Year 2000 solution routine, and wherein the Year 2000 solution routine is not derived from the source code; and
   altering each identified object code instruction with an object code instruction to effect a transfer of control to the Year 2000 solution routine, without altering source code from which the object code was generated.

9. An article as recited in claim 8, wherein the step of identifying at least one string of values comprises the steps of:
   comparing strings of values in storage with a stored set of strings of values that correspond to potential date formats; and
   identifying at least one string of values in storage that matches a string of values in the stored set as a potential date field.

10. An article as recited in claim 9, wherein the step of identifying at least one string of values comprises the steps of:
   displaying information associated with each potential date field; and
   receiving user-input verification information associated with the displayed information.

11. An article as recited in claim 8, wherein the step of identifying at least one string of values comprises the steps of:
   displaying information regarding at least one string of values to allow a single decision by the user regarding the identified string(s) of values, to apply to all of the further potential date fields.

12. A method of processing a computer object code program, comprising the steps of:
   identifying object code instructions in the object program which refer to date information for an operation involving more than one century;
   providing a runtime fix code, wherein the runtime fix code comprises a Year 2000 solution routine, and wherein the Year 2000 solution routine is not derived from source code; and
   altering each identified object code instruction with an object code instruction to effect a transfer of control to the Year 2000 solution routine, without altering source code from which the object code was generated;
   wherein the Year 2000 solution routine comprises a routine for altering the execution of an identified instruction in accordance with the Year 2000 solution and thereafter returning control to the object code; and
   wherein the step of identifying object code instructions comprises the steps of:
      identifying at least one string of values in storage that corresponds to potential date information having year information;
      identifying at least one instruction in the application which operates with the identified at least one string of values and which results in a further date value in a further field in the application; and
      identifying the further field as a potential date field.

13. A method as recited in claim 12, wherein said Year 2000 solution routine comprises a windowing routine.

14. A method of processing a computer object code program, comprising the steps of:
   identifying object code instructions in the object program which refer to date information for an operation involving more than one century;
   providing a runtime fix code, wherein the runtime fix code comprises a Year 2000 solution routine, and wherein the Year 2000 solution routine is not derived from source code; and
   altering each identified instruction with an instruction to effect a transfer of control to the Year 2000 solution routine, without altering source code from which the object code was generated;
   wherein said Year 2000 solution routine comprises a compression routine;
   wherein the Year 2000 solution routine comprises a routine for altering the execution of an identified instruction in accordance with a Year 2000 solution and thereafter returning control to the object code; and
   wherein the step of identifying object code instructions comprises the steps of:
      identifying at least one string of values in storage that corresponds to potential date information having year information;
      identifying at least one instruction in the application which operates with the identified at least one string of values and which results in a further date value in a further field in the application; and
      identifying the further field as a potential date field.

15. A method of processing a computer object code program, comprising the steps of:
   identifying object code instructions in the object program which refer to date information for an operation involving more than one century;
   providing a runtime fix code, wherein the runtime fix code comprises a Year 2000 solution routine, and wherein the Year 2000 solution routine is not derived from source code; and
   altering each identified instruction with an instruction to effect a transfer of control to the Year 2000 solution routine, without altering source code from which the object code was generated;
   wherein said Year 2000 solution routine comprises an expansion routine;
   wherein the Year 2000 solution routine comprises a routine for altering the execution of an identified instruction in accordance with a Year 2000 solution and thereafter returning control to the object code; and
   wherein the step of identifying object code instructions comprises the steps of:
      identifying at least one string of values in storage that corresponds to potential date information having year information;
      identifying at least one instruction in the application which operates with the identified at least one string of values and which results in a further date value in a further field in the application; and
      identifying the further field as a potential date field.

16. A method of processing a computer object code program, comprising the steps of:
   identifying object code instructions in the object program which refer to date information for an operation involving more than one century; and
   altering each identified instruction with an instruction to effect a transfer of control to a Year 2000 solution routine:
   wherein the Year 2000 solution routine comprises a routine for altering the execution of an identified instruction in accordance with a Year 2000 solution and thereafter returning control to the object code; and
   wherein the step of identifying object code instructions comprises the steps of:
      identifying at least one string of values in storage that corresponds to potential date information having year information;
      identifying at least one instruction in the application which operates with the identified at least one string of values and which results in a further date value in a further field in the application;

identifying the further field as a potential date field;

identifying starting seeds with an object code analysis tool, wherein the starting seeds correspond to at least one of source code variables and fields in input records that refer to date information in operations involving more than one century; and running the object program with instructions relating to date information in operations involving more than one century to identify further seeds corresponding to date information in operations involving more than one century.

17. A method as recited in claim 16, wherein the step of identifying at least one string of values comprises the steps of:

comparing stings of values in the code with a stored set of strings of values that correspond to potential date values; and identifying at least one string of values in the code that matches a string of values in the stored set as a potential date field.

18. A method as recited in claim 17, wherein the step of identifying at least one string of values further comprises the steps of:

displaying information associated with each potential date field; and receiving user-input verification information associated with the displayed information.

19. A method as recited in claim 16, wherein the step of identifying at least one string of values further comprises the step of:

displaying information regarding at least one string of values to allow a single decision by the user regarding the identified string(s) of values, to apply to all of the further potential date fields.

20. A system including a computer for identifying date fields in a software application code having instructions which operate with fields for containing strings of values, comprising:

means, performed by the computer, for identifying at least one string of values in the code that corresponds to potential date information having year information;

means, performed by the computer, for identifying at least one instruction in the code which operates with the identified at least one string of values and which results in a further date value in a further field in the application;

means, performed by the computer, for identifying the further field as a potential date field;

providing a runtime fix code, wherein the runtime fix code comprises a Year 2000 solution routine, and wherein the Year 2000 solution routine is not derived from source code; and altering each identified object code instruction with an object code instruction to effect a transfer of control to the Year 2000 solution routine, without altering source code from which the object code was generated.

21. A system as recited in claim 20, wherein the means for identifying at least one string of values comprises:

means, performed by the computer, for comparing stings of values in the code with a stored set of strings of values that correspond to potential date values; and means, performed by the computer, for identifying at least one string of values in the code that matches a string of values in the stored set as a potential date field.

22. A system as recited in claim 21, wherein the means for identifying at least one string of values further comprises:

a display device for displaying information associated with each potential date field; and an input device for receiving user-input verification information associated with the displayed information.

* * * * *